US008661164B2

(12) United States Patent
Chen et al.

(10) Patent No.: US 8,661,164 B2

(45) Date of Patent: Feb. 25, 2014

(54) METHOD OF USB DEVICE ENUMERATION INCLUDING DETECTING THE OPERATING SYSTEM TYPE OF THE USB HOST

(75) Inventors: Jin-Ru Chen, Hsinchu (TW); Ying-Che Hsu, Hsinchu (TW); Tsao-Jiang Chang, Taipei (TW); Wen-Juin Huang, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 220 days.

(21) Appl. No.: 13/211,072

(22) Filed: Aug. 16, 2011

(65) Prior Publication Data

US 2012/0054372 A1 Mar. 1, 2012

Related U.S. Application Data

(60) Provisional application No. 61/376,413, filed on Aug. 24, 2010.

(51) Int. Cl.
*G06F 3/00* (2006.01)
*G06F 13/12* (2006.01)

(52) U.S. Cl.
USPC .................................... 710/8; 710/10; 710/62

(58) Field of Classification Search
None
See application file for complete search history.

(56) References Cited

U.S. PATENT DOCUMENTS 7,574,534 B2 * 8/2009 Bolan et al. .................... 710/15
2008/0005370 A1 * 1/2008 Bolan et al. ....................... 710/8
2008/0276012 A1 * 11/2008 Mesa et al. ..................... 710/13

* cited by examiner

*Primary Examiner* — Idriss N Alrobaye
*Assistant Examiner* — David Martinez
(74) *Attorney, Agent, or Firm* — Chen Yoshimura LLP

(57) ABSTRACT

A USB device enumeration process implemented in a USB device is described. The USB device first detects a type of the operating system (OS) of the USB host connected to the device, and performs device enumeration using a process selected from multiple stored processes based on the detected host OS type. To detect the host OS type, the USB device first presents itself to the host as a USB MSD or HID, performs device enumeration to collect OS behavior factors from the host, and determines the OS type from the OS behavior factors. Thereafter, the USB device performs actual device enumeration by presenting itself as the USB device it actually is, using an enumeration process specific to the detected host OS type. The multiple stored enumeration processes are customer configurable. Further, a method is provided to stop an enumeration process when the host is in a BIOS stage.

25 Claims, 11 Drawing Sheets

METHOD OF USB DEVICE ENUMERATION INCLUDING DETECTING THE OPERATING SYSTEM TYPE OF THE USB HOST

This application claims priority under 35 USC §119(e) from U.S. Provisional Patent Application No. 61/376,413, filed Aug. 24, 2010, which is herein incorporated by reference in its entirety.

BACKGROUND OF THE INVENTION

1. Field of the Invention

This invention relates to USB device enumeration, and in particular, it relates to a process of USB device enumeration in which the USB device first detects the type of operating system (OS) on the USB host and then performs USB device enumeration using a process specific to the detected OS type.

2. Description of the Related Art

USB device enumeration is a process performed by a USB device and a USB host upon the device being connected to the host. The device enumeration process is repeated when the USB device is disconnected and re-connected to the host, or when the host is restated, etc. During the device enumeration process, the USB host collects device type and characteristics information from the USB device, and assigns an address to the USB device.

As an increasing number of devices are being designed as USB compliant devices (e.g. human interface devices, mass storage devices, audio devices, video devices, communication devices, printers, and numerous other classes of USB devices), USB hosts are often provided with corresponding abilities to communicate with these various types of USB devices. For example, RNDIS (Remote Network Driver Interface Specification) is a type of USB network interface device, which is supported on Windows™ XP and later Windows™ operating systems (OS); ISD (Internet Sharing Device) is a type of RNDIS, which is supported on Windows™ Vista™ and later Windows™ OS; and CDC/ECM (CDC Ethernet Control Model) is a type of USB network interface device, which is supported by MAC™ OS and Linux™. At the same time, as many computer platforms support USB, it is desirable for any given USB device to be able to be connected to and used with various different computer platforms. However, different OS's often support different USB device types, and the required device enumeration process may be different depending on the kind of host the device is connected to. For a given USB device, it is often difficult to use a single enumeration flow or sequence to satisfy all OS's.

SUMMARY OF THE INVENTION

As pointed out above, the USB device enumeration process may be different depending on the kind of USB host the device is connected to. Thus, an embodiment of the present invention provides a method in which a USB device is capable of executing enumeration processes corresponding to different OS types, and when the USB device is connected to a USB host, the USB device first identifies the OS type of the USB host, before starting the actual enumeration process. The USB device then executes suitable enumeration steps depending on the identified OS type.

Further, the BIOS behavior of a USB host may alter the OS-type detection flow by the USB device. Thus, according to another embodiment of the present invention, when the USB device is connected to a USB host, the USB device detects whether the host is in a BIOS stage, and if it is, the USB device alters its behavior to prevent the OS-detection flow from occurring in the BIOS stage. Specifically, a vendor specific ID is used to accomplish goal.

Moreover, according to yet another embodiment of the present invention, the flow of device enumeration is configurable by a system vendor, so that the USB device can be adapted for different applications.

Accordingly, the present invention is directed to a USB device enumeration method that substantially obviates one or more of the problems due to limitations and disadvantages of the related art.

An object of the present invention is to provide a USB enumeration method that allows a USB device to reliably perform device enumeration for different host OS types.

Another object of the present invention is to provide a USB enumeration method that eliminates undesirable influence by the BIOS stage.

Yet another object of the present invention is to provide a customer configurable USB enumeration that can flexibly deal with different host OS types.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a USB device enumeration method implemented in a USB device, which includes: (a) determining a type of operating system (OS) of a USB host connected to the USB device; and (b) performing USB device enumeration with the USB host using a USB device enumeration process selected from a plurality of USB device enumeration processes stored in the USB device based on the determined type of OS of the USB host.

Step (a) may include: (a1) presenting the USB device to the USB host as a commonly supported USB device; (a2) collecting host OS behavior factors from messages received from the USB host; and (a3) determining the type of OS of the USB host based on the collected host OS behavior factors.

Preferably, the commonly supported USB device is a USB Mass Storage Device or a USB Human Interface Device. The plurality of host OS types that can be determined include Windows™ Vista, Win7, Windows™ XP, Linux, and MAC OS.

A learning process for generating a OS behavior knowledge database includes: (c1) presenting the USB device to a USB host connected to the USB device as a commonly supported USB device, the USB host having a known OS type; (c2) collecting host OS behavior factors from messages received from the USB host; (c3) repeating steps (c1) and (c2) for a plurality of USB hosts each having a known OS type; and (c4) analyzing the host OS behavior factors collected in step (c2) to discover relationships between the OS behavior factors and the OS types.

The determining step may include steps that cause a BIOS stage to stop the enumeration process and then continuing the host OS type determination after the BIOS stage, including: (a1) presenting the USB device to the USB host as a commonly supported USB device; (a2) if a request for device descriptor is received from the USB host prior to receiving any message setting a device address, returning a device descriptor to the USB host indicating a vender-specific device; (a3) if a request for device descriptor is received from the USB host after receiving a message setting a device address, returning a device descriptor indicating a commonly supported USB device; (a4) after step (a3), collecting host OS behavior factors from messages received from the USB host; and (a5) determining the type of OS of the USB host based on the collected host OS behavior factors.

The process used in the enumeration step (b) may be customer configurable, so that the USB device may be configured to act as different USB devices depending on the host OS type determined.

In another aspect, the present invention provides a USB device having a controller executing programs to perform the above methods.

It is to be understood that both the foregoing general description and the following detailed description are exemplary and explanatory and are intended to provide further explanation of the invention as claimed.

DETAILED DESCRIPTION OF THE PREFERRED EMBODIMENTS

A first embodiment of the present invention provides a method in which a USB device can execute different enumeration processes corresponding to different operating system (OS) types. When the USB device is connected to a USB host, the USB device first identifies the OS type of the USB host, before starting the actual enumeration flow. The USB device then executes suitable enumeration steps depending on the identified OS type.

Embodiments of the present invention may be implemented in a USB device which includes a USB interface circuit, a control circuit, and a memory. The control circuit includes a USB device controller that controllers the USB interface, and may include other circuits or modules. The memory stores programs executed by the control circuit, USB descriptors, and other information.

Figure 1:
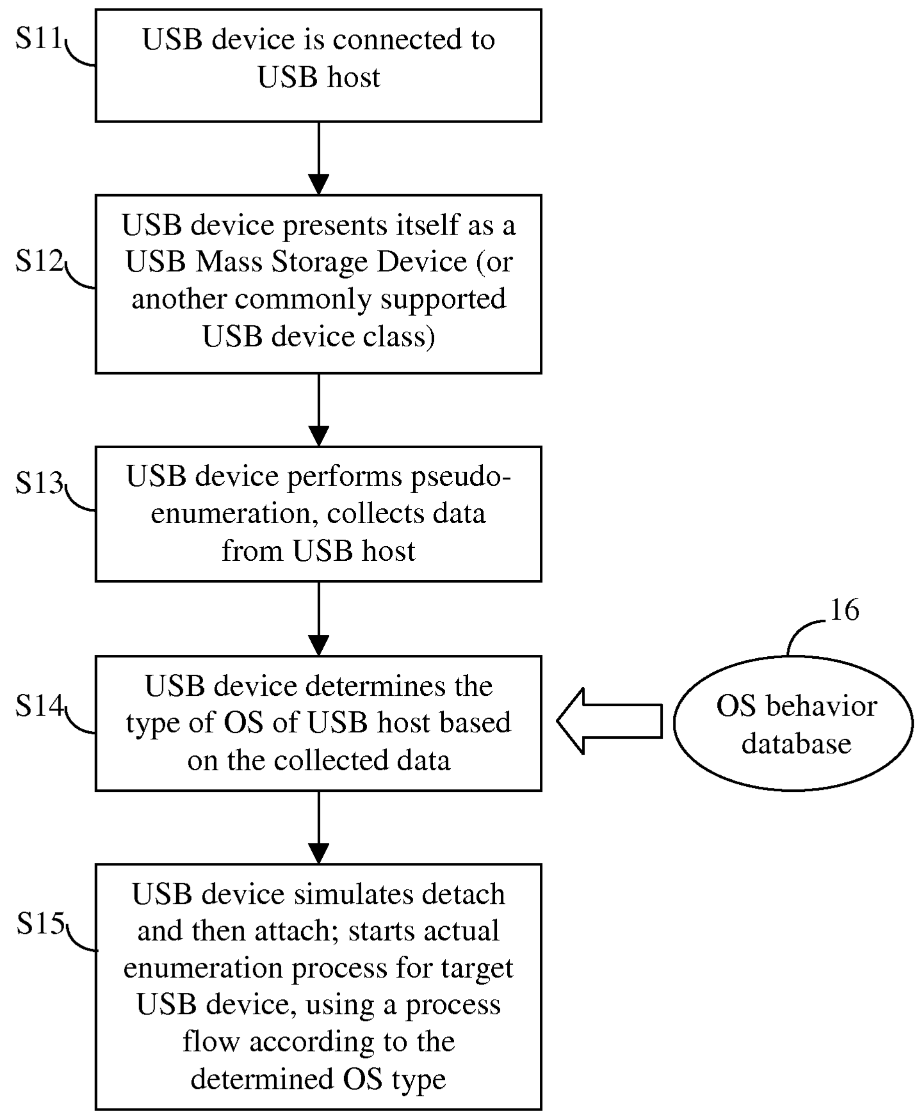
FIG. 1 illustrates a USB device enumeration process according to a first embodiment of the present invention.

FIG. 1 illustrates the flow of a USB device enumeration process according to the first embodiment. The steps shown in FIG. 1 are performed by the USB device; the enumeration steps performed by the USB host during the device enumeration are normal steps performed by conventional hosts and are not altered by this embodiment. Within the USB device, the process shown in FIG. 1 may be implemented in a USB device controller which is a component that controls the communication with a USB host controller of the USB host, or implemented in a separate host OS detection module communicating with the device controller. The implementation may be in the form of hardware circuits, or firmware or software stored in a memory of the USB device and executed by the USB device controller or host OS detection module.

As shown in FIG. 1, upon the USB device being connected to a USB host (step S11), the USB device presents itself to the USB host as a USB Mass Storage Device (such as CD-ROM, flash drive, etc.), or as another commonly supported USB device (i.e. a device that is widely used and is supported by virtually all computer platforms; examples include HID (Human Interface Device) class devices such as mouse and keyboard) (step S12). In this step, the USB device presents itself as the commonly supported device (by returning the appropriate device descriptor) regardless of what device it actual is. Then, the USB device carries out a pseudo-enumeration process with the USB host (step S13).

During this pseudo-enumeration process, the USB device receives messages (requests) from the host, which the host sends as a normal part of its enumeration process. The USB device may respond to the host's requests as appropriate, although the content of the response may not be reflective of the true characteristics of the actual device. The messages from the USB host contain various information, some of which is characteristic of the type of OS of the host. For example, the request from the host may indicate whether the host supports certain classes of USB devices; the values of certain fields of some messages may be different for different OS, etc. The USB device collects such information from the messages and uses it to attempt to determine the OS type of the host (step S14). In the determining step, the USB device can use various algorithms and logics, including fuzzy logic, to determine the OS type of the host, by utilizing pre-stored knowledge (e.g. an OS behavior knowledge database 16 pre-stored in the USB device) about the expected behaviors of the different types of OS.

For example, the information (sometimes referred to as OS behavior factors in this disclosure) collected by the USB device in the pseudo-enumeration step may come from MOD (Microsoft OS Descriptor, a set of USB vendor request and string descriptors used to allow the underlying USB device to claim its compatible device class or change settings on the host) related messages, wLength of Get Configuration Descriptor, IAD (Interface Association Descriptor, a USB descriptor to inform the host the relationship of interfaces of an USB device) related messages, identity of the second request after SET_ADDRESS, etc.:

MOD-Compat ID=Y or N,

MOD-Ext. property=Y or N,

Support IAD=Y or N wLength of the first Configuration Descriptor, wLength=4, wLength=255, wLength=other value etc.

TABLE I

Table I below is a summary of some exemplary behavior factors based on observation.

| OS | MOD-Compat ID | MOD-Ext. Property | Support IAD | wLength of 2nd Configuration Descriptor | 2nd action after Set Address | wLength of 1st Configuration Descriptor |
|---|---|---|---|---|---|---|
| Win7 X64 | Y | Y | Y | N/A | Get Configuration Descriptor | 255 |
| Win7 X86 | Y | Y | Y | N/A | Get Configuration Descriptor | 255 |
| Vista SP2 X64 | Y | Y | Y | N/A | Get Configuration Descriptor | 255 |
| Vista SP2 X86 | Y | Y | Y | N/A | Get Configuration Descriptor | 255 |
| Vista X86 | Y | Y | Y | N/A | Get Configuration Descriptor | 255 |
| XP X86 SP3 | Y | Y | Y | 255 | Get Configuration Descriptor | 9 |
| XP X86 SP2 | Y | Y | Y | 255 | Get Configuration Descriptor | 9 |
| XP X86 SP1 | Y | N | N | 255 | Get Configuration Descriptor | 9 |
| XP X86 | N | N | N | 255 | Get Configuration Descriptor | 9 |
| Linux x86 (2.6.31) | N | N | N | fit | Get Configuration Descriptor | 9 |
| MAC-OS 10.5 x86 | N | N | N | fit | Get Configuration Descriptor | 4 |
| MAC-OS 10.6 x86 | N | N | N | fit | Get string of iProduct | 4 |
| PC0910191487 boot to Win7 X64 | N | N | N | fit | Get Configuration Descriptor | 9 |
| PC09701019335 boot XP SP2 | N | N | N | N/A | Set Configuration | 255 |
| PC0701014439 boot XP | N | N | N | N/A | Get bRequest = 0xFE | 511 |
| MAC-OS 10.5 x86 boot | N | N | N | fit | Get Configuration Descriptor | 4 |
| MAC-OS 10.6 x86 boot | N | N | N | fit | Get String | 2 |

In one particular embodiment, in step S14, the OS behavior factors are used to determine the OS type using a scoring system. The score assignment described in Table II below is used as an example:

TABLE II

| OS behavior factor | | score |
|---|---|---|
| With MOD | | +1000 |
| first Get Configuration Descriptor | wLength = 4 | −100 |
| | wLength = 9 | −50 |
| | wLength = 255 | +1000 |
| 2nd Get Configuration Descriptor | wLength = 255 | +500 |
| SET_ADDRESS | | Clear to zero |

After the USB device collects the various behavior factors (step S13), the scores are totaled, and the host OS type is determined from the total score as shown in Table III below:

TABLE III

| host OS type | total score |
|---|---|
| Windows ™ Vista, Win7 | +2000 |
| Windows ™ XP SP2, SP3 | +1450 |
| Windows ™ XP SP1 | +1450 |
| Windows ™ XP | +450 |
| Linux | −50 |
| MAC OS | −100 |

The score assignment in Table II and the score vs. OS relationship in Table III may be stored in the OS behavior knowledge database 16.

From the above, it can be seen that this scoring system can detect various OS's including Windows™ Vista and Win7, Windows™ XP, Linux, and MAC OS. This scoring system is a fuzzy detection algorithm and can determine the most likely OS type of the host. Of course, the scoring system shown above is merely an example; other scores can be assigned, so long as the scores serve to differentiate the characteristics of the various OS's. Other types of OS detection algorithms can also be used. Any suitable OS detection algorithms can be used to implement embodiments of the present invention. Moreover, OS behavior factors for various computer platforms may change in the future, and the OS detection algorithm may need to be changed accordingly.

After the host OS type is detected, the USB device can start an actual enumeration process for the target USB device using a process flow according to the detected OS type (step S15). Here, the term "target USB device" refers to the device type that the USB device will actually function as, rather than the device type that is initially presented to the USB host in the pseudo-enumeration steps S12 to S14. The USB device is pre-loaded with relevant information that allows the device to carry out enumeration correctly for various OS types; in step S15, the information for the OS type determined in step S14 is used to carry out the actual enumeration process.

To improve OS detection accuracy, steps S12, S13 and S14 of FIG. 1 may be repeated for additional iterations. Each additional iteration may be initiated by simulating a USB detach and then a USB attach. In different iterations, the USB device may present itself as different types of USB devices to gather different behavior factors of the OS. For example, in a first iteration, the USB devices may present itself as a USB mass storage device, and collect OS behavior factors sufficient to determine whether the host runs a Windows OS or non-Windows OS. If the OS is determined to be a non-Windows OS, a second iteration is executed in which the USB device presents itself as a CDC/ECM device, and collect OS behavior factor to determine whether the host is a MAC/Linux OS or something else (e.g. BIOS stage, which is considered as a particular type of OS in this embodiment).

In the host OS detection process of FIG. 1 (steps S12-S14), using a commonly supported USB device (e.g. a mass storage device) to collect the OS behavior information can prevent the USB device initialization process from being blocked on some OS. For example, on Windows™ XP series OS, if an unknown USB device is used initially, the OS will display a pop-up dialog box to prompt the user to install a driver for the device before accessing other new USB devices, and the user must cancel the pop-up dialog box in order to proceed further. This would be inconvenient for the user.

Figure 2:
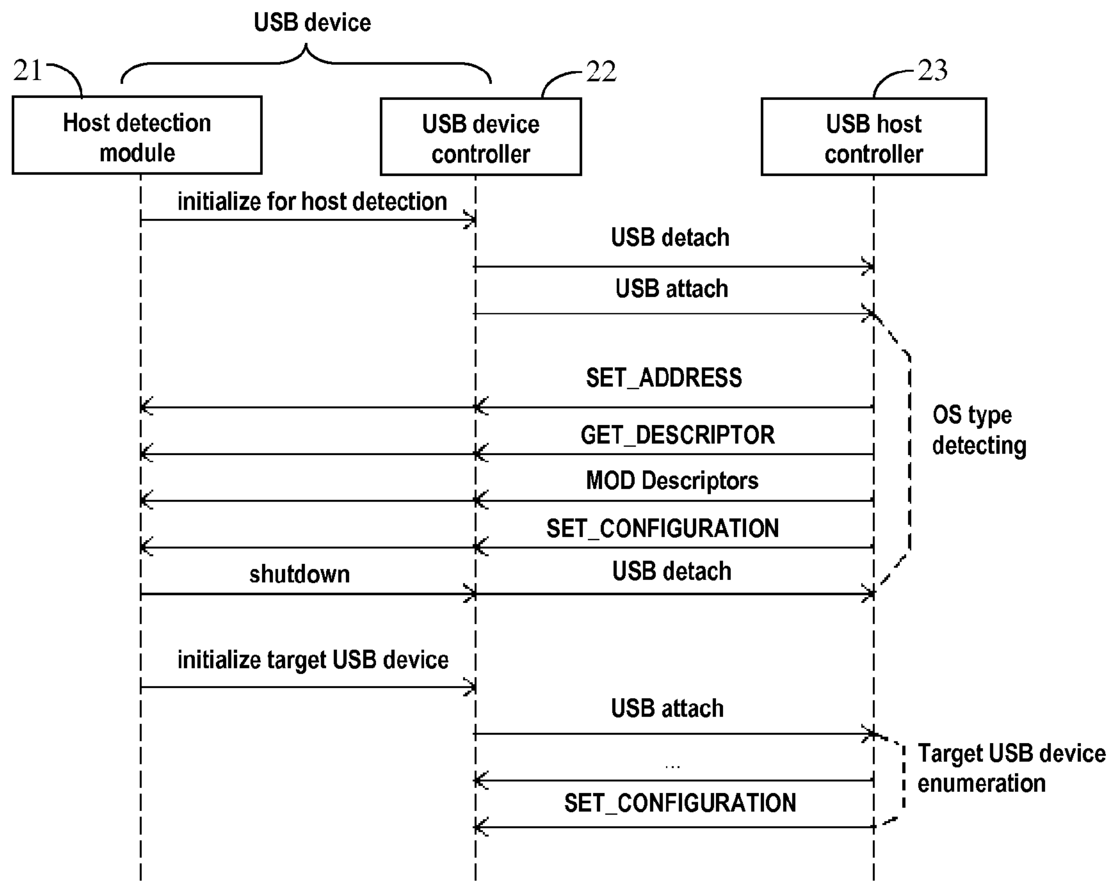
FIG. 2 illustrates the USB messages during a device enumeration process in the first embodiment.

FIG. 2 schematically illustrates the flow of messages during the enumeration process of FIG. 1, using a particular example. In this example, the USB device includes a USB device controller 22 and a separate host detection module 21. The host detection module 21 instructs the device controller 22 to initialize for host detection. The device controller sends USB detach and USB attach signals to the host (the host controller 23), and the host sends a number of messages to the device controller, such as SET_ADDRESS, GET_DESCRIPTOR which is a request for descriptors from the device, MOD Descriptors, SET_CONFIGURATION, etc. as depicted in FIG. 2. The messages from the host are forwarded by the device controller 22 to the host detection module 21 which determines the host OS type.

As the USB device initially presents itself to the USB host as a mass storage device, the USB host will send messages relevant to a mass storage device. As certain point, after the host detecting module 21 has collected sufficient OS behavior information and determined the OS type, the host detecting module 21 causes the USB device controller 22 to detach from the USB host. This may be done, for example, by sending a shut down command to the USB device controller 22 as illustrated in FIG. 2. Subsequently, the host detecting module 21 causes the USB device controller 22 to again attach to the USB host, this time presenting itself as the target USB device. The timing of the USB detach and attach signals should be chosen such as to avoid errors noticeable to the user.

While in FIG. 2 the host detecting module 21 and USB device controller 22 are two separate modules, they may alternatively be a single module (e.g. a USB device controller) that performs both the functions of communicating with the USB host and OS detection.

Figure 3:
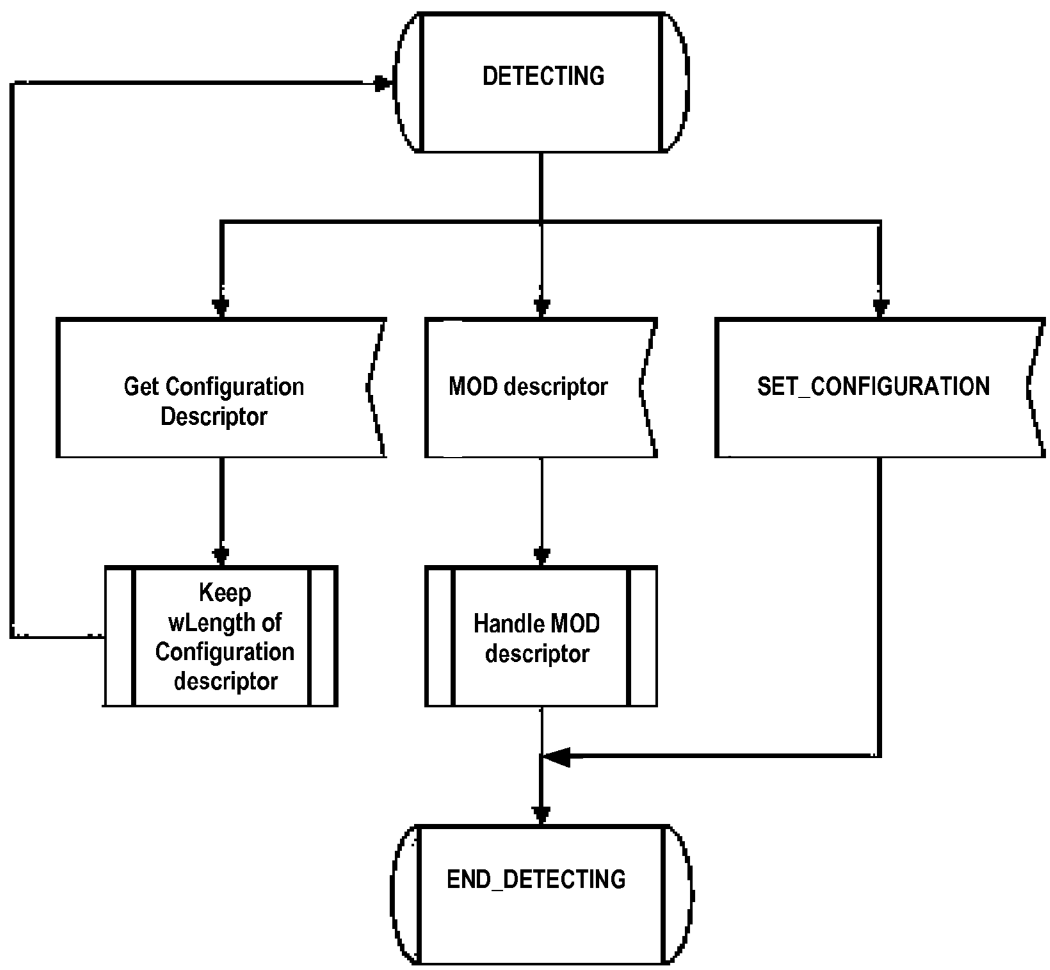
FIG. 3 illustrates a state machine of an exemplary OS detection flow by the USB device in the first embodiment.

FIG. 3 illustrates a state machine of an exemplary OS detection flow by the USB device. In this diagram, the blocks labeled "Get Configuration Descriptor", "MOD descriptor" and "SET_CONFIGURATION" represent the USB device receiving information from the outside (the USB host). From the Get Configuration Descriptor messages, the USB device keeps the wLength of the configuration descriptor, and continues the detecting process. When the USB device receives the MOD descriptor, it handles the MOD descriptor as appropriate, and ends the detecting process. When the USB device receives SET_CONFIGURATION, it ends the detecting process. The exemplary detection flow illustrate in FIG. 3 generally corresponds to the example shown in FIG. 2.

Figure 4:
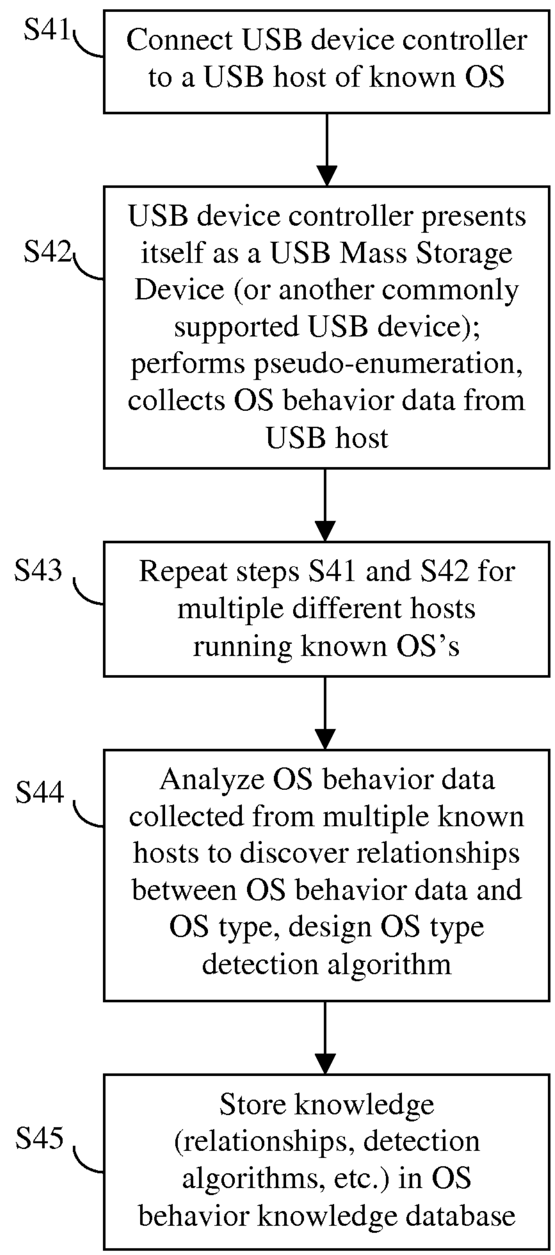
FIG. 4 illustrates a process for generating an OS behavior knowledge database in the first embodiment.

FIG. 4 illustrates a process for generating an OS behavior knowledge database 16. First, a USB device is connected to a USB host having a known OS (step S41). The USB device presents itself as a USB mass storage device or some other commonly supported USB device, and performs pseudo-enumeration similar to step S13 of FIG. 1 to collects behavior data from the USB host (step S42). These steps are repeated for multiple USB hosts running different known OS's (step S43). Then, an analysis is carried out to discover correlations between OS behavior factors and the known OS types, and to design an algorithm for detecting OS type based on OS behavior factors and their correlations with the known OS types (step S44). Step S44 may be performed by a human, or by a computer, or by a human with the assistance of a computer. When performed by a computer, step S44 is essentially a machine leaning process. After step S44, steps S41 to S43 may be repeated to collect more OS behavior data when desired to carry out further iterations of step S44. The result of the learning process, such as a scoring system represented by Tables II and III above, and/or other OS detection algorithms, are stored in the OS behavior knowledge database 16 (step S45).

The process illustrated in FIG. 4 is a learning process, and can be used to build a knowledge database 16 without any prior knowledge. Thus, the OS behavior knowledge database 16 can be generated by the USB device manufacturer using the learning process. However, the behavior of existing OS's with respect to commonly supported USB devices (e.g. USB mass storage device) tends to be relatively constant; thus, a database 16 generated by one party can be used by multiple USB device manufacturers. When new OS's are added to the mix of OS's, or when changes occur in the USB industry such as change in the specification or addition of new device classes, etc., it may be necessary to re-perform the learning process to update or re-build the OS behavior knowledge database 16. It may also be desirable to equip each USB device with a leaning algorithm to allow a system vendor to improve detection accuracy and OS-type coverage of the USB host detection algorithm, or to allow an end user to perform trouble shooting in the USB host detecting process.

A second embodiment of the present invention provides a method of OS detection while avoiding undesirable influence of the BIOS stage of the host computer. A USB device is configured upon the device being connected to a computer, as well as when the device is already physically connected to the host and the host enters the BIOS stage. A host computer typically enters BIOS stage when the computer is booted up, or is awakened from a hibernation state. In the BIOS stage, the behavior of some host may undesirably interfere with the host OS detection process of the USB device.

For example, on some OS, if the USB device has been configured in the BIOS stage, the device will not be reconfigured later. This interferes with OS detection process because the USB device enumeration process in BIOS stage usually has nothing to do with the incoming OS stage. Therefore, if the device cannot perform USB device enumeration after entering OS stage, the OS type determined in BIOS stage may be incorrect and bring to user an unusable USB device.

To avoid such undesirable interference by BIOS, a method is provided according to a second embodiment of the present invention, by which the USB device uses a vender-specific ID to prevent BIOS from configuring the device.

Figure 5:
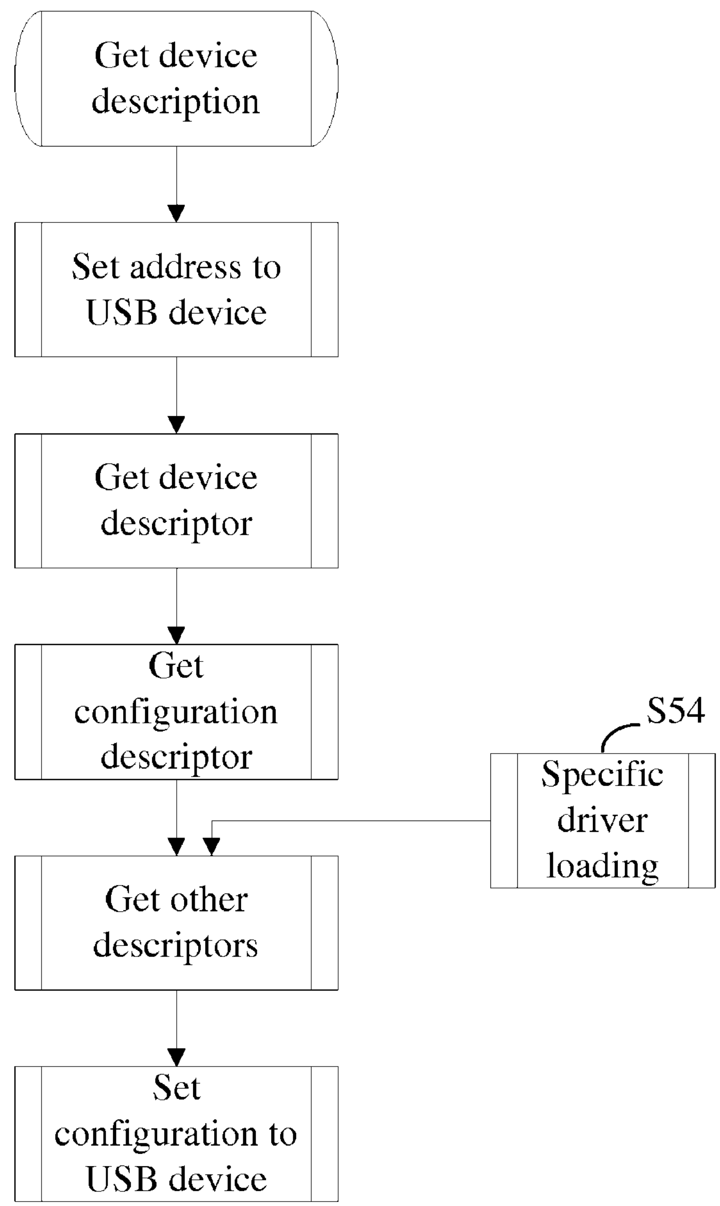
FIG. 5 illustrates a conventional process in a USB host for configuring a USB device.

Conventionally, before using a USB device, the BIOS or OS queries the device for descriptors several times to identify the USB device type, and loads related driver to handle the USB device if necessary. This process is generally illustrated in FIG. 5. If the USB device is a vender-specific device that requires a vendor-specific driver, the device will specify a device class id "0xff". Accordingly, the USB host will load a vendor-specific driver to handle such a USB device (see FIG. 5, step S54).

The second embodiment of the present invention takes advantage of this feature of the USB host. According to the second embodiment, when the USB host queries the USB device for device descriptor the first time (i.e. before a SET_ADDRESS message from the host), the USB device returns a device descriptor having a device class id "0xff". This can cause the BIOS to stop the USB enumeration process, and as a result, the device can be configured by the OS later. This process is illustrated in FIG. 6.

Figure 6:
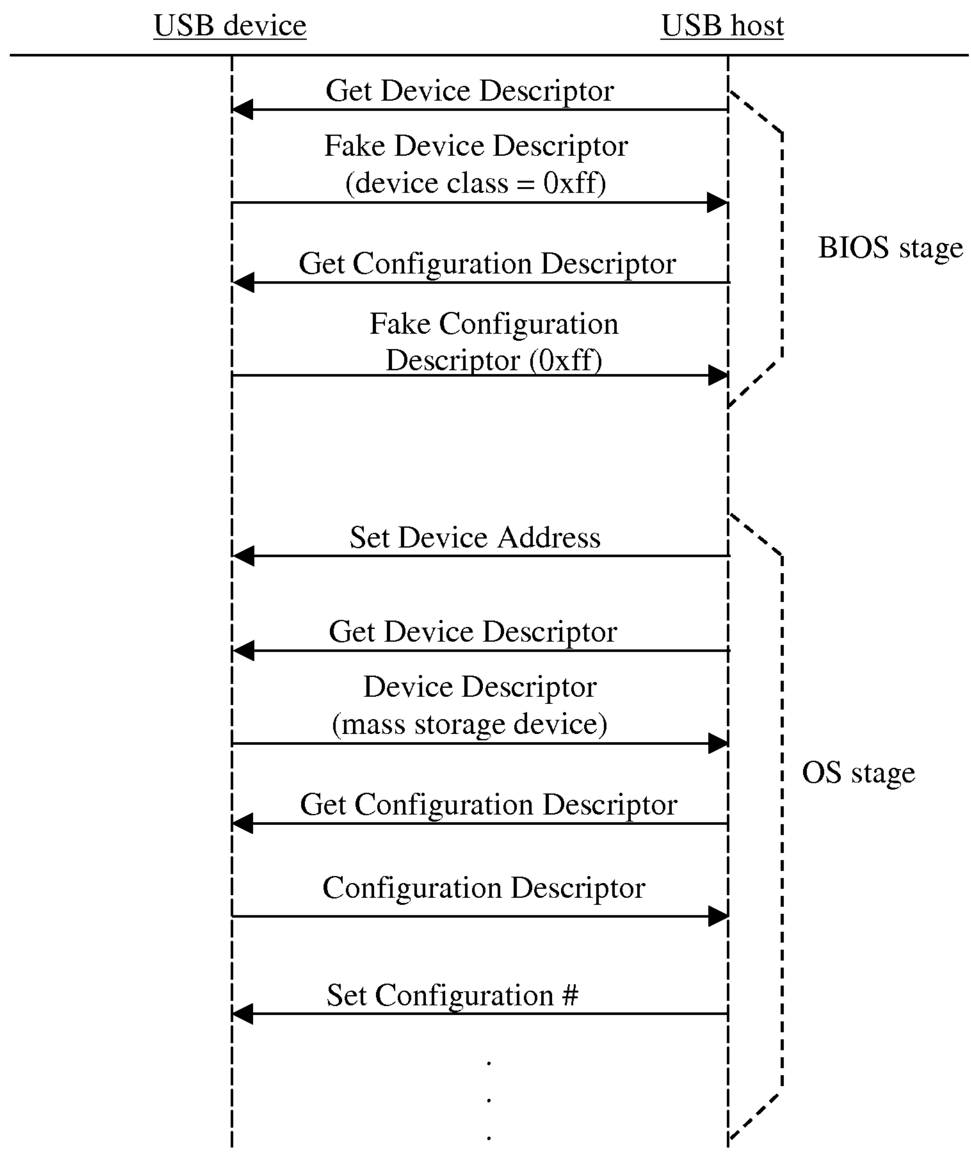
FIG. 6 illustrates a USB device enumeration process starting from BIOS stage according to a second embodiment of the present invention.

As shown in FIG. 6, when the BIOS of the USB host requests the device descriptor the first time, the USB device returns a fake device descriptor having a device class id "0xff". Some BIOS will also request the configuration descriptor, in which case the USB device will return a fake configuration descriptor 0xff. The step of requesting configuration descriptor does not always occur. At this point, because the device class id indicates a vendor-specific device, the BIOS will stop the USB enumeration process.

Later, in the OS stage (i.e. after the BIOS stage is concluded), the USB host sends a SET_ADDRESS message to the USB device. Thereafter, when the USB device receives another request for the device descriptor from the USB host, the USB device returns a descriptor for a USB mass storage device or another commonly supported USB device. The USB host also requests the configuration descriptor, and the USB device returns an appropriate descriptor (the step of returning the configuration descriptor may be omitted). At this time, the process of the first embodiment, including collecting OS behavior factors, determining the OS type, and performing USB device enumeration specific for the determined OS type, can be carried out.

Note that after concluding the BIOS stage, most USB host will send another request for device descriptor after SET_ADDRESS, so the USB device does not need to detach and re-attached to initiate a USB enumeration process. On some OS, the USB host does not re-request the device descriptor. In such a situation, the USB device can simulate a USB detach and then a USB attach to initiate the process.

Referring to the state machine illustrated in FIG. 3, if the USB device successfully prevents the BIOS from completing the USB enumeration process, the state machine will not enter the END_DETECTING state. However, if the USB device is unsuccessful in preventing the BIOS from completing the USB enumeration process, the state machine will enter the END_DETECTING state without having correctly determined the OS type. In this case, the USB device can initiate another USB device enumeration by simulating a USB detach and then a USB attach.

To adapt a USB device to different applications, it is desirable to provide a customer-configurable process for device enumeration. A third embodiment of the present invention enables such customer-configurable device enumeration process.

Customer-configurable device enumeration process is useful in situations, for example, when a USB device is designed to have hardware, firmware and/or software that allow it to function as different types of USB devices. For example, a USB device may be designed so that it can function as either an ISD (a type of network interface device supported on Windows™ Vista™ and later Windows™ OS), or an RNDIS (a type of USB network interface device supported on Windows™ XP and later Windows™ OS), or a CDC/ECM (a type of USB network interface device supported by MAC™ OS and Linux™), to perform network interface functions. Then, when the USB device is connected to a host, the USB device detects the OS type of the host, and presents itself to the USB host as one of the above network interface devices depending on the detected OS type, so that it can be properly supported by the host to carry out network interface functions.

Figure 7:
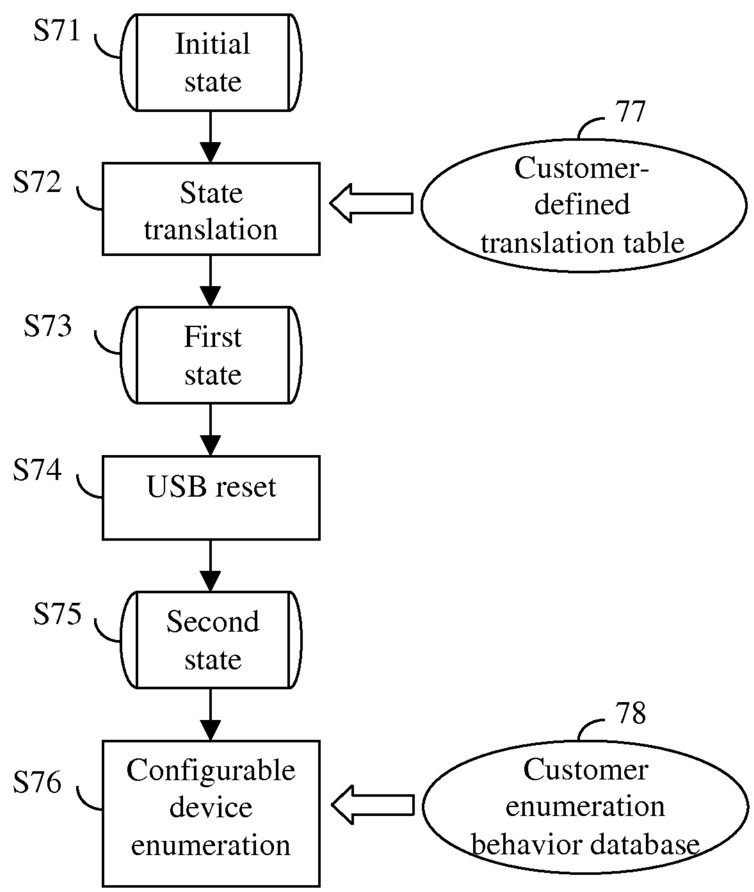
FIG. 7 illustrates the transition of states in a customer-configurable USB device enumeration process according to a third embodiment of the present invention.
Figure 8:
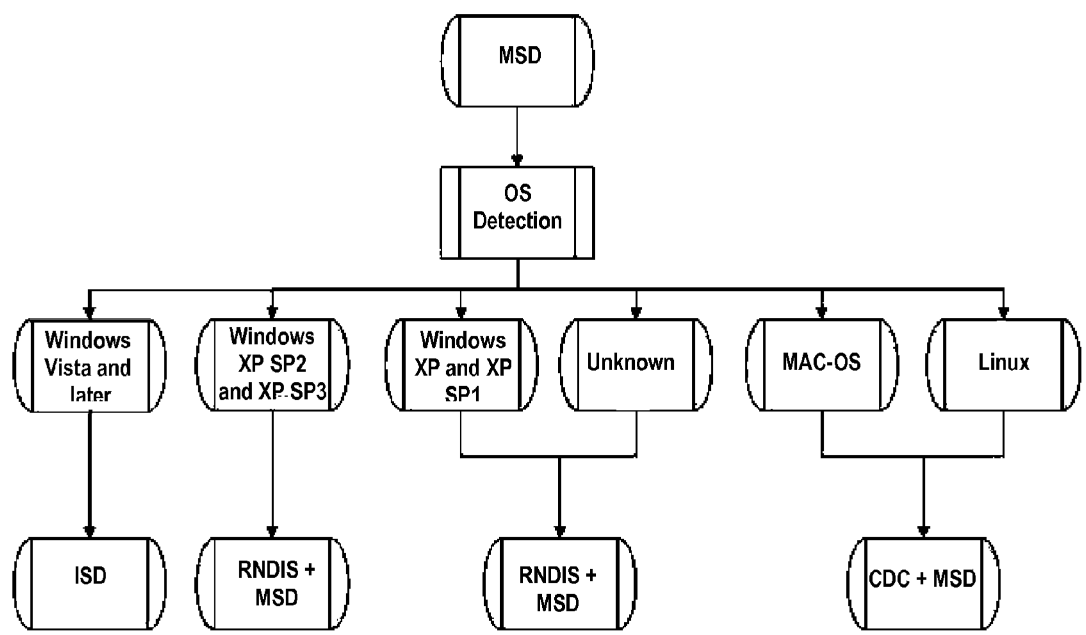
FIGS. 8 and 9 illustrate two examples of a customer-configurable USB device enumeration process flow according to the third embodiment.
Figure 9:
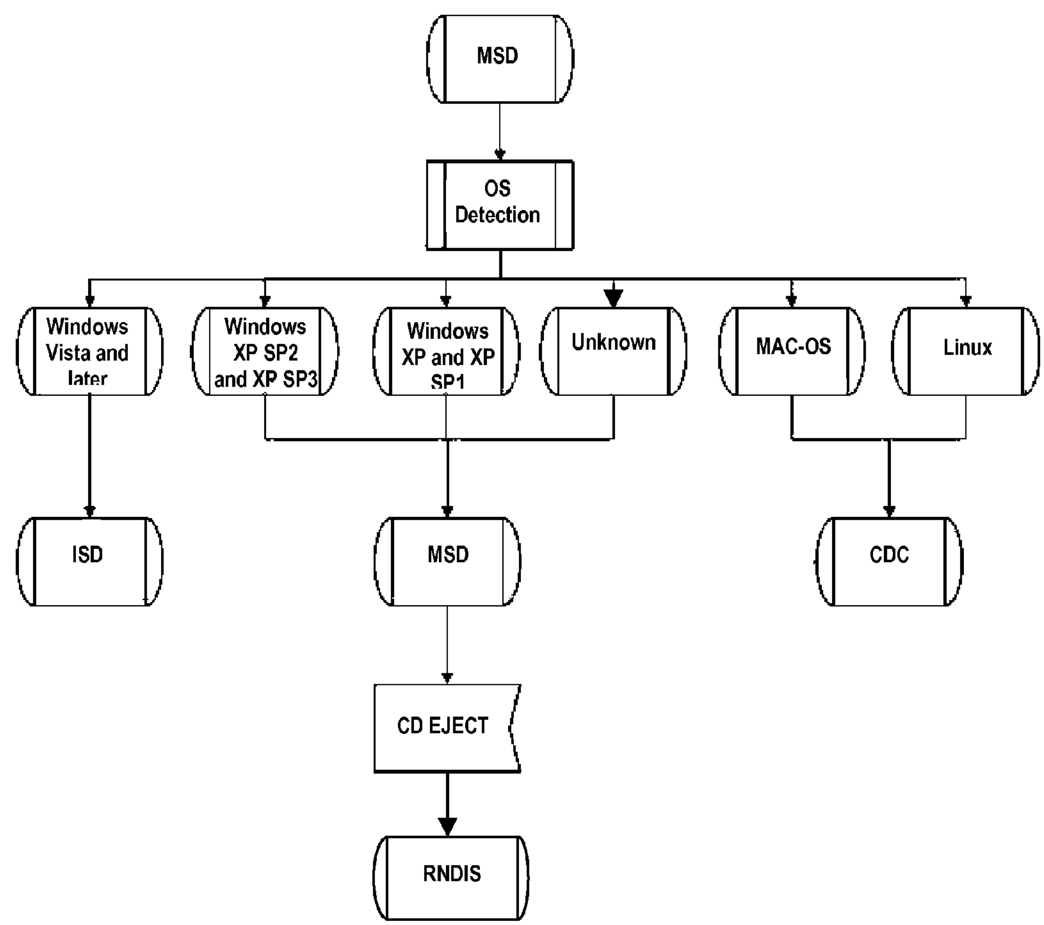

A customer-configurable device enumeration process according to the third embodiment may be implemented using a state machine as generally illustrated in FIG. 7, and two examples are shown in FIGS. 8-9. FIG. 7 illustrates generally the transition of states in the device enumeration flow. The initial state S71 is the state which the USB device is in after the OS detection step has been completed. This state may be referred to as the MSD (mass storage device) state in this disclosure because the USB device has presented itself as a mass storage device during the OS detection process. It should be noted that the initial state (the OS detection result) is not specific to any customer-configurable aspect of the enumeration process.

Then, a state translation step is performed (step S72), using a customer-defined translation table 77, to translate the state from the initial state S71 to another defined state of the state machine (referred to as the first state S73). The translation table defines an association between the OS detection result and states. For example, the OS detection process may generate three possible results: 1: Windows Vista and Windows 7; 2: Linux; 3: MAC OS; 4: Windows XP SP2 and later; and 5: Others; and the translation table may have the following form:

Translation=(1, VISTA7)(2, LINUXMAC)(3, LINUXMAC)(4, XPSP)(5, OTHER) where VISTA7 and LINUXMAC are two states in the state machine. Thus, after the state translation step S72, the first state S73 may be VISTA7 or LINUXMAC sates.

Then, the USB device performs a USB reset (step S74). For example, this can be done by a USB detach and attach. The state machine is in a second state S75 after the USB reset. Then, the state machine goes through a state transition generally referred to as "configurable device enumeration" step S76 in FIG. 7, by applying customer-defined state transition rules stored in a customer enumeration behavior database 78.

Two specific examples of USB device enumeration process flow are used here for purposes of illustration, as shown in FIGS. 8 and 9. In the process shown in FIG. 8, the USB device initially presents itself as a MSD (the initial state), and performs OS detection. The device enumeration procedure to be carried out depends on the result of the OS detection and is configurable by the customer. In this particular example, the enumeration process is configured such that: if the detected OS is Windows Vista or later, a device enumeration process for ISD is carried out (in which the device presents itself to the host as an ISD by reporting the device descriptor for ISD); if the detected OS is Windows XP SP2 or XP SP3, a device enumeration process for RNDIS+MSD is carried out; if the detected OS is Windows XP or XP SP1, or unknown OS, a device enumeration process for RNDIS+MSD is carried out; and if the detected OS is MAC-OS or Linux, a device enumeration process for CDC+MSD is carried out. These processes are depicted as the four states labeled "ISD," "RNDIS+MSD," "RNDIS+MSD" and "CDC+MSD" in FIG. 8. As shown in FIG. 8, these four states do not transition to other states.

In this disclosure, the notation "+" denotes a composite USB device having multiple functional units.

The enumeration processes for multiple USB device types are pre-stored in the USB device, however, the customer can configure the device to specify which enumeration processes are performed, under what conditions, in what sequence, etc. In a particular implementation, the customer configures the process by providing configuration elements that define state transition, where the configuration elements may have the following format:

(state, device type, time, next state)

Here, "state" and "next state" are names of states of the state machine. "Device type" is the USB device type which the USB device will present itself as in device enumeration in the current state. "Time" is a parameter that determines the transition to the next state. Time=n means the state will time out and transition to the next state in n seconds, and time=0 means the state will never time out (i.e. forever).

In addition to the "time" value, the following state transition rules also apply. First, the timeout countdown stops if a USB Set_Configuration message is received for CDC, RNDIS, and ISD device types, so that the state will not transition to the next state. Second, if an MSD ejection message is received, the state will immediately transition to the next state.

These configuration elements are provided by the customer and stored in the USB device. For example, to implement the flow shown in FIG. 8, the customer may provide configuration elements as follows:

FLOW1=(VISTA7, ISD, 0, VISTA7)(XPSP, RNDIS+MSD, 0, XPSP)(LINUXMAC, CDC+MSD, 0, LINUXMAC)(OTHER, RNDIS+MSD, 0, OTHER)

Similarly, in the example shown in FIG. 9, the USB device initially presents itself as a MSD (the initial state), and performs OS detection. The enumeration process is configured such that: if the detected OS is Windows Vista and later, a device enumeration process for ISD is carried out; if the detected OS is Windows XP SP2 and XP SP3, or Windows XP and XP SP1, or unknown OS, a device enumeration process for MSD is carried out; and if the detected OS is MAC-OS or Linux, a device enumeration process for CDC is carried out. These processes are depicted as the three states labeled "ISD," "MSD" and "CDC" in FIG. 9. In this flow, the MSD state transitions to the "RNDIS" state when timeout occurs or if a MSD EJECT is received. In other words, while performing enumeration for a MSD, a MSD EJECT is received or a time out occurs, the USB device starts to perform an enumeration process for RNDIS.

To implement the flow shown in FIG. 9, the customer may provide configuration elements as follows:

FLOW2=(VISTA7, ISD, 0, VISTA7)(LINUXMAC, CDC, 0, LINUXMAC)(OTHER, MSD, 16, OTHER1)(OTHER1, RNDIS, 0, OTHER1)

It should be note here that in the depictions of FIGS. 8 and 9, the states are labeled by the USB device type such as "ISD" etc., while in the configuration element format described above, the states are identified by the OS type such as "VISTA7" etc. These different labels refer to the same things. It should be understood that the use of different labels are merely due to the convenience in graphical and textual representation, respectively.

It should be noted that the implementation of the device enumeration process for each OS type and each device type can be accomplished by those skilled in the art without undue experimentation, by referring to the relevant standards and other available documentation.

In addition to the state transition approach described above, other suitable methods may be used to implement configurable enumeration processes.

Figure 10:
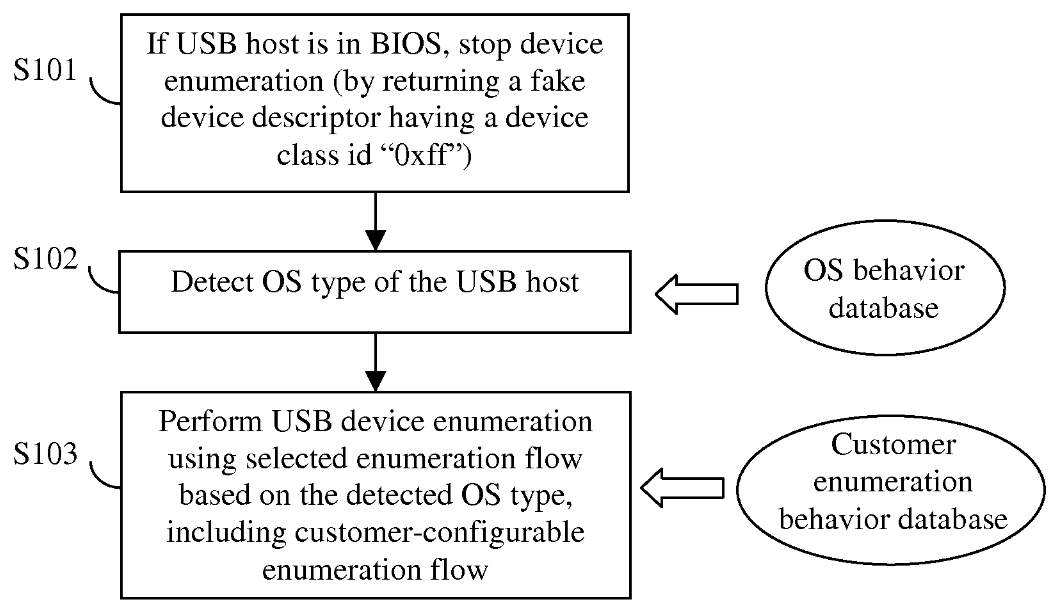
FIG. 10 is a high-level flow chart illustrating a USB device enumeration process implementing the first, second and third embodiments of the present invention.

FIG. 10 is a high-level flow chart illustrating a USB device enumeration process performed by a USB device that implements the first, second and third embodiments of the present invention. This process is performed when the USB device enumeration process starts, i.e. when the USB device is connected to a USB host or when the host boots up or resumes from a hibernation or sleep state with the USB device already connected. First, if the USB device determines that the USB host is in the BIOS stage, the USB device stops the device enumeration from completing in the BIOS stage (step S101). For example, if the USB device receives a request for device descriptor before SET_ADDRESS, the USB device returns a fake device descriptor containing a device class id "0xff" (vender-specific device). This process corresponds to the second embodiment shown in FIG. 6. Then, when the host is out of the BIOS stage, the USB device performs a process to detect the OS type of the host (step S102). The OS behavior knowledge database is used in this process. This process is described in more detail in the first embodiment shown in FIGS. 1-3. Then, after the OS type is determined, the USB device performs a device enumeration process using a selected process based on the detected OS type of the host, and the device enumeration process may be customer-configurable to allow the USB device to present itself as one of multiple kinds of USB devices depending on the detected OS type (step S103). The customer enumeration behavior database is used in this process. This process is described in more detail in the third embodiment shown in FIGS. 7-9.

Figure 11:
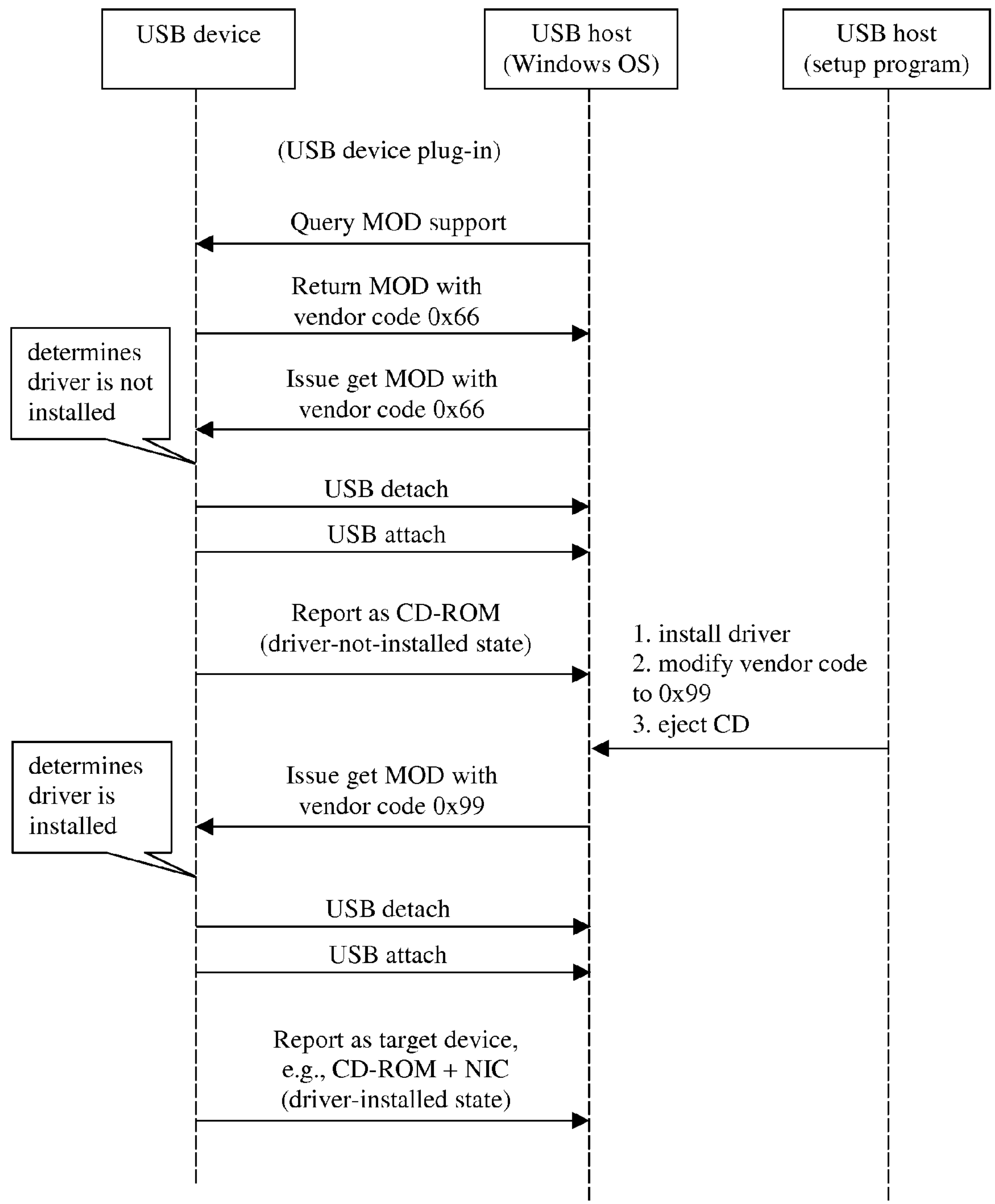
FIG. 11 illustrates a process by which a USB device detects the presence of a device driver on the host and causes the driver to be installed when needed.

An additional process may be implemented within the above framework, by which the USB device detects whether an appropriate device driver is installed on the host, and if not, causes the driver to installs the driver. This driver detection method uses the Microsoft OS Descriptors (MOD) as a means to pass information. As shown in FIG. 11, after the USB device is first plugged into the host, the host issues an inquiry to the device as to whether the device supports MOD. The inquiry is a Get String Descriptor message with index 0xEE. In response, the device returns the OS string descriptor with a particular vendor code, such as 0x66. The device can choose what particular value is used as the vendor code in this response. Then, the host issues a MOD request with the vendor code it received from the device, i.e. 0x66 in this example. When the device receives this MOD request with a vendor code 0x66, i.e. the same vendor code as the code previously send by the device to the host, the device determines that host does not have the appropriate driver installed.

The above steps are a part of the host OS type detection process (first embodiment). In other words, the host issues the requests as if they are a part of normal USB enumeration, but the device uses information in these requests to detect whether the host has the appropriate driver installed. These steps are a part of the OS detection process described as the first embodiment of the present invention. At this point, the device has determined the OS type of the host.

When the device determines that the appropriate driver has not been installed on the host, the device goes into a "driver-not-installed" state, which may be one of the states in the state machine described in the third embodiment. In this state, the device simulates a USB detach and attach. Thereafter, in the subsequent USB enumeration process, the device presents itself as a CD-ROM or another MSD, having an autorun program stored thereon. The autorun program performs, or causes another setup program (also stored in the simulated CD-ROM) to perform, the following functions: Installing the appropriate driver program, also stored in the simulated CD-ROM; modifying the vendor code stored in host to another vendor code, 0x99 in this example, different from the vendor code received earlier from the device, 0x66 in this example; and causing the host to issue a MSD EJECT command, more specifically, a SCSI Start Stop Unit command with LoEj equals to eject media.

After MSD EJECT, the host issues another MOD request, but this time with the new vendor code 0x99 which the autotun or setup program has modified. From the vendor code value, the device determines that the host now has the proper driver program installed, and simulates a detach and attach to start an actual USB device enumeration process. In this actual enumeration process, the device is in a "driver-installed" state, and presents itself as the target USB device, such as CD-ROM+NIC in the illustrated example.

In the above method, the value of the vendor code modified by the autorun or setup program may be used as a way to inform the USB device what target USB device it should present itself as in the actual USB enumeration process. Thus, different driver programs may modify the vendor code to different values, so that the subsequent MOD request will be issued with these different vendor codes. When the USB device receives the MOD request with one of such vendor codes, the device will present itself as a particular target device based on the vendor code value. The vendor code in the OS string descriptor may also be used to pass other information between the USB device and host.

The USB device enumeration processes according to the various embodiments are implemented in the USB device by hardware, firmware or software. In one exemplary implementation, the processes are performed by a USB device controller (or a control section including multiple control modules) of the USB device which executes programs (firmware or software) stored in a program memory of the USB device. In particular, the programs implement multiple USB device enumeration processes are stored in the USB device, and a selected one of the multiple device enumeration process may be performed based on the detected OS type of the host. The customer may configure the USB device enumeration (as described in the third embodiment) flow by storing new or modified programs in the program memory. The related data (OS behavior knowledge database, customer enumeration behavior database, etc.) are also stored in a memory of the USB device.

It will be apparent to those skilled in the art that various modification and variations can be made in the USB device enumeration method and related apparatus of the present invention without departing from the spirit or scope of the invention. Thus, it is intended that the present invention cover modifications and variations that come within the scope of the appended claims and their equivalents.

What is claimed is:

1. A USB device enumeration method implemented in a USB device, comprising:

(a) determining a type of operating system (OS) of a USB host connected to the USB device; and (b) after determining the type of OS of the USB host, performing USB device enumeration with the USB host using a USB device enumeration process selected from a plurality of USB device enumeration processes stored in the USB device based on the determined type of OS of the USB host.

2. The method of claim 1, wherein step (a) includes:

(a1) presenting the USB device to the USB host as a commonly supported USB device;

(a2) collecting host OS behavior factors from messages received from the USB host; and (a3) determining the type of OS of the USB host based on the collected host OS behavior factors.

3. The method of claim 2, wherein the commonly supported USB device is a USB Mass Storage Device or a USB Human Interface Device.

4. The method of claim 2, wherein the host OS behavior factors include one or more factors selected from a group consisting of: Microsoft OS Descriptor related messages, wLength of a first Get Configuration Descriptor message, wLength of a second Get Configuration Descriptor message, Interface Association Descriptor related messages, and identity of a second request after SET_ADDRESS.

5. The method of claim 2, wherein the USB device has a pre-stored OS behavior knowledge database including information regarding known behavior factors of a plurality of known OS types, and wherein step (a3) is performed by using the pre-stored OS behavior knowledge database.

6. The method of claim 5, wherein the plurality of known OS types include Windows™ Vista operating systems, Win7 operating systems, Windows™ XP operating systems, Linux operating systems, and MAC OS operating systems.

7. The method of claim 5, further comprising:

(c) prior to step (a), generating the OS behavior knowledge database, comprising:

(c1) presenting the USB device to a USB host connected to the USB device as a commonly supported USB device, the USB host having a known OS type;

(c2) collecting host OS behavior factors from messages received from the USB host;

(c3) repeating steps (c1) and (c2) for a plurality of USB hosts each having a known OS type; and (c4) analyzing the host OS behavior factors collected in step (c2) to discover relationships between the OS behavior factors and the OS types.

8. The method of claim 1, wherein step (a) includes:

(a1) presenting the USB device to the USB host as a commonly supported USB device;

(a2) if a request for device descriptor is received from the USB host prior to receiving any message setting a device address, returning a device descriptor to the USB host indicating a vender-specific device;

(a3) if a request for device descriptor is received from the USB host after receiving a message setting a device address, returning a device descriptor indicating a commonly supported USB device;

(a4) after step (a3), collecting host OS behavior factors from messages received from the USB host; and (a5) determining the type of OS of the USB host based on the collected host OS behavior factors.

9. The method of claim 1, further comprising: prior to step (a), storing configuration elements in the USB device which define an enumeration process flow, wherein step (b) is performed according to the process flow defined by the configuration elements.

10. The method of claim 1, wherein step (a) further determines whether an appropriate driver program for a target USB device is installed on the USB host, and wherein step (b) includes if the driver is not installed, presenting the USB device as a Mass Storage Device (MSD) storing the driver and an autorun program that causes the driver to be installed on the host.

11. The method of claim 10, wherein step (a) includes determining whether the driver program is installed on the USB host based on a value of a vendor code in a MOD (Microsoft OS Descriptor) request from the USB host.

12. The method of claim 1, wherein step (a) includes performing a USB device enumeration with the USB host by presenting the USB device to the USB host as a commonly supported USB device;

wherein the USB device enumeration in step (b) includes presenting the USB device to the USB host as device different from the commonly supported USB device in step (a); and wherein the method further comprises, after step (a) and before step (b):

(d) simulating a USB detach and then stimulating a USB attach.

13. A USB device comprising:

a USB interface circuit;

a control circuit controlling the USB interface circuit; and a memory storing program code executed by the control circuit, the program code configured to cause the control circuit to execute a process including:

(a) determining a type of operating system (OS) of a USB host connected to the USB device; and (b) after determining the type of OS of the USB host, performing USB device enumeration with the USB host using a USB device enumeration process selected from a plurality of USB device enumeration processes stored in the USB device based on the determined type of OS of the USB host.

14. The USB device of claim 13, wherein step (a) includes:

(a1) presenting the USB device to the USB host as a commonly supported USB device;

(a2) collecting host OS behavior factors from messages received from the USB host; and (a3) determining the type of OS of the USB host based on the collected host OS behavior factors.

15. The USB device of claim 14, wherein the commonly supported USB device is a USB Mass Storage Device or a USB Human Interface Device.

16. The USB device of claim 14, wherein the host OS behavior factors include one or more factors selected from a group consisting of: Microsoft OS Descriptor related messages, wLength of a first Get Configuration Descriptor message, wLength of a second Get Configuration Descriptor message, Interface Association Descriptor related messages, and identity of a second request after SET_ADDRESS.

17. The USB device of claim 14, wherein the memory stores a pre-stored OS behavior knowledge database including information regarding known behavior factors of a plurality of known OS types, and wherein step (a3) is performed by using the pre-stored OS behavior knowledge database.

18. The USB device of claim 17, wherein the plurality of known OS types include Windows™ Vista operating systems, Win7 operating systems, Windows™ XP operating systems, Linux operating systems, and MAC OS operating systems.

19. The USB device of claim 17, wherein the process further comprises:

(c) prior to step (a), generating the OS behavior knowledge database, comprising:

(c1) presenting the USB device to a USB host connected to the USB device as a commonly supported USB device, the USB host having a known OS type;

(c2) collecting host OS behavior factors from messages received from the USB host;

(c3) repeating steps (c1) and (c2) for a plurality of USB hosts each having a known OS type; and (c4) analyzing the host OS behavior factors collected in step (c2) to discover relationships between the OS behavior factors and the OS types.

20. The USB device of claim 13, wherein step (a) includes:

(a1) presenting the USB device to the USB host as a commonly supported USB device;

(a2) if a request for device descriptor is received from the USB host prior to receiving any message setting a device address, returning a device descriptor to the USB host indicating a vender-specific device;

(a3) if a request for device descriptor is received from the USB host after receiving a message setting a device address, returning a device descriptor indicating a commonly supported USB device;

(a4) after step (a3), collecting host OS behavior factors from messages received from the USB host; and (a5) determining the type of OS of the USB host based on the collected host OS behavior factors.

21. The USB device of claim 13, wherein process further comprises: prior to step (a), storing configuration elements in the USB device which define an enumeration process flow, wherein step (b) is performed according to the process flow defined by the configuration elements.

22. The USB device of claim 13, wherein step (a) further determines whether an appropriate driver program for a target USB device is installed on the USB host, and wherein step (b) includes if the driver is not installed, presenting the USB device as a Mass Storage Device (MSD) storing the driver and an autorun program that causes the driver to be installed on the host.

23. The USB device of claim 22, wherein step (a) includes determining whether the driver program is installed on the USB host based on a value of a vendor code in a MOD (Microsoft OS Descriptor) request from the USB host.

24. The USB device of claim 13, wherein step (a) includes performing a USB device enumeration with the USB host by presenting the USB device to the USB host as a commonly supported USB device;

wherein the USB device enumeration in step (b) includes presenting the USB device to the USB host as device different from the commonly supported USB device in step (a); and wherein the method further comprises, after step (a) and before step (b):

(d) simulating a USB detach and then stimulating a USB attach.

25. A method implemented in a USB device for determining a type of operating system (OS) of a USB host connected to the USB device, comprising:

(a) presenting the USB device to the USB host as a commonly supported USB device;

(b) if a request for device descriptor is received from the USB host prior to receiving any message setting a device address, returning a device descriptor to the USB host indicating a vender-specific device;

(c) if a request for device descriptor is received from the USB host after receiving a message setting a device address, returning a device descriptor indicating a commonly supported USB device;

(d) after step (c), collecting host OS behavior factors from messages received from the USB host; and (e) determining the type of OS of the USB host based on the collected host OS behavior factors.

* * * * *